United States Patent [19]
Vaughan

[11] 3,804,582
[45] Apr. 16, 1974

[54] FURNACE FOR FIBER PRODUCTION
[75] Inventor: Raymond C. Vaughan, Buffalo, N.Y.
[73] Assignee: The Carborundum Company, Niagara Falls, N.Y.
[22] Filed: June 9, 1972
[21] Appl. No.: 263,732

[52] U.S. Cl. .................................. 432/211
[51] Int. Cl. ............................... F27b 3/18
[58] Field of Search ..................... 432/210, 211

[56] References Cited
UNITED STATES PATENTS
480,699   8/1892   Oliver ........................... 432/210
3,134,659   5/1964   Labino ........................ 432/210 X Primary Examiner—John J. Camby
Attorney, Agent, or Firm—David E. Dougherty et al.

[57] ABSTRACT

In a melting furnace for materials used in the production of fibers, a channel is formed by a spiral wall attached to the furnace bottom. A fiberizing material which is added at one end of the channel follows a spiral course to the other end of the channel located near the outer portion of the spiral.

13 Claims, 4 Drawing Figures

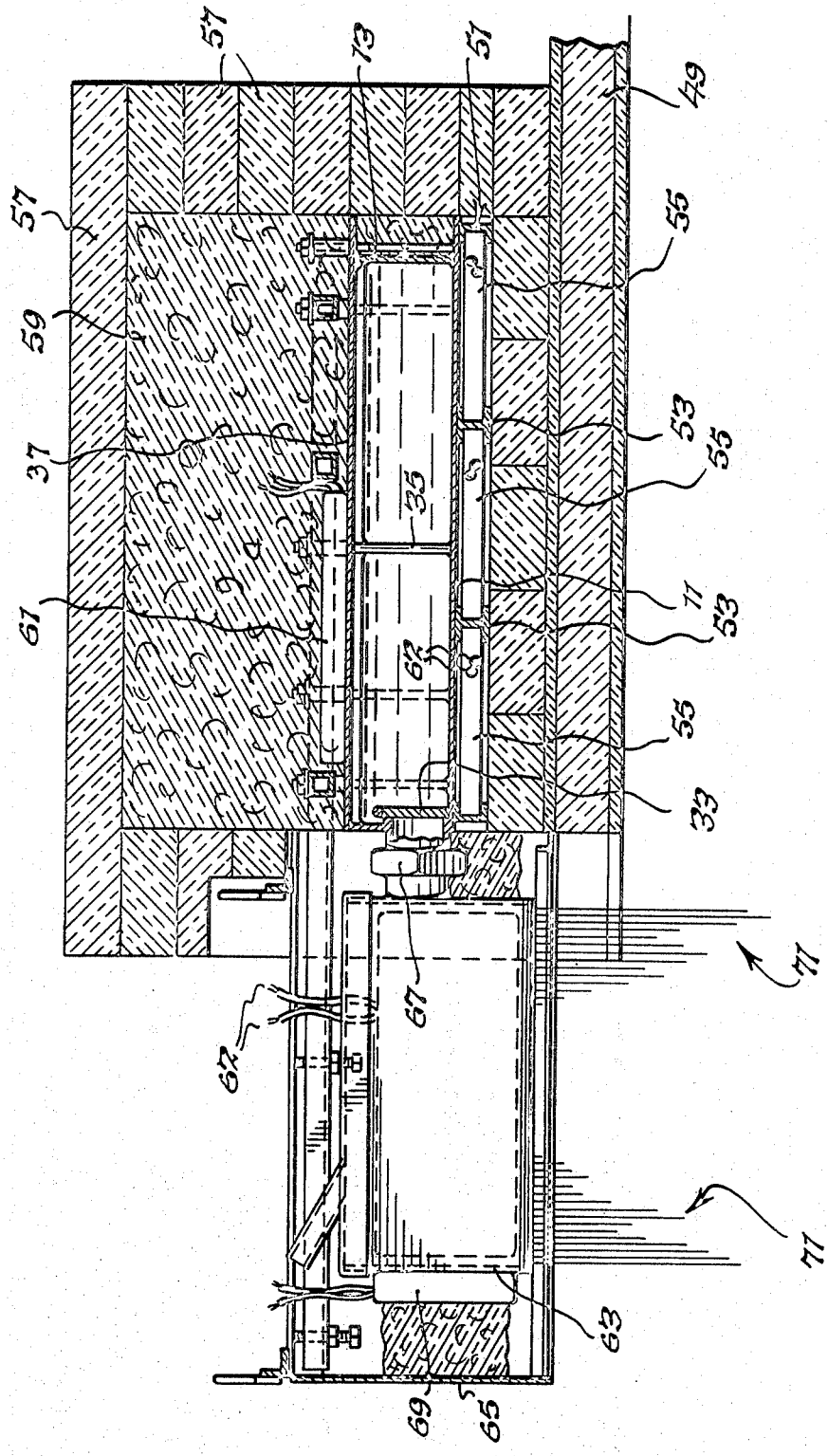

FURNACE FOR FIBER PRODUCTION

BACKGROUND OF THE INVENTION

In the production of fibers, such as thermoplastic fibers, a bushing is employed having a plurality of circular orifices through which molten material flows in the form of streams. The streams are subsequently attenuated into fibers. The furnace used for melting the fiber material is generally bowl-shaped or rectangular shaped and has a bushing connected to the forehearth area. Generally, solid material is metered into the furnace where it contacts liquid material and melts.

In producing a thermoplastic fiber, it is necessary to maintain a proper and uniform temperature to insure a highly refined state. If the temperature is too high, the material will be too viscous to form fibers. If the temperature is too low, the molten fluid from the orifices of the bushing will break when being drawn. In melting furnaces where the fiberizing material is added to a bath, it has been difficult to achieve proper temperature control. Furthermore, the addition of new material to the bath often creates a foaming and frothing which undesirably interferes with fiber drawing. A minute air bubble in the mixture can result in the breaking of a strand.

SUMMARY OF THE INVENTION

In the present invention, a melting furnace for materials used in the production of fibers is provided. A channel is formed by a spiral wall attached to the bottom of the furnace. The wall describes a spiral course for the flow of a fiberizable fluid from a central portion to an outlet at an outer portion of the spiral. A furnace top has an inlet for the addition of fiberizable material. The heating elements surrounding the furnace are provided for maintaining proper temperature control.

The melting furnace obviates many deficiencies of prior art furnaces. Due to the compactness of the spiral channel, even heating may be achieved. The introduction of solid fiberizing material into the center portion of the spiral and the subsequent flowing of the liquid material in the spiral channel, results in a uniform product at the furnace outlet.

BRIEF DESCRIPTION OF THE DRAWINGS

FIG. 4 is a vertical sectional view along line 4—4 of FIG. 4.

DESCRIPTION OF A PREFERRED EMBODIMENT

Figure 1:
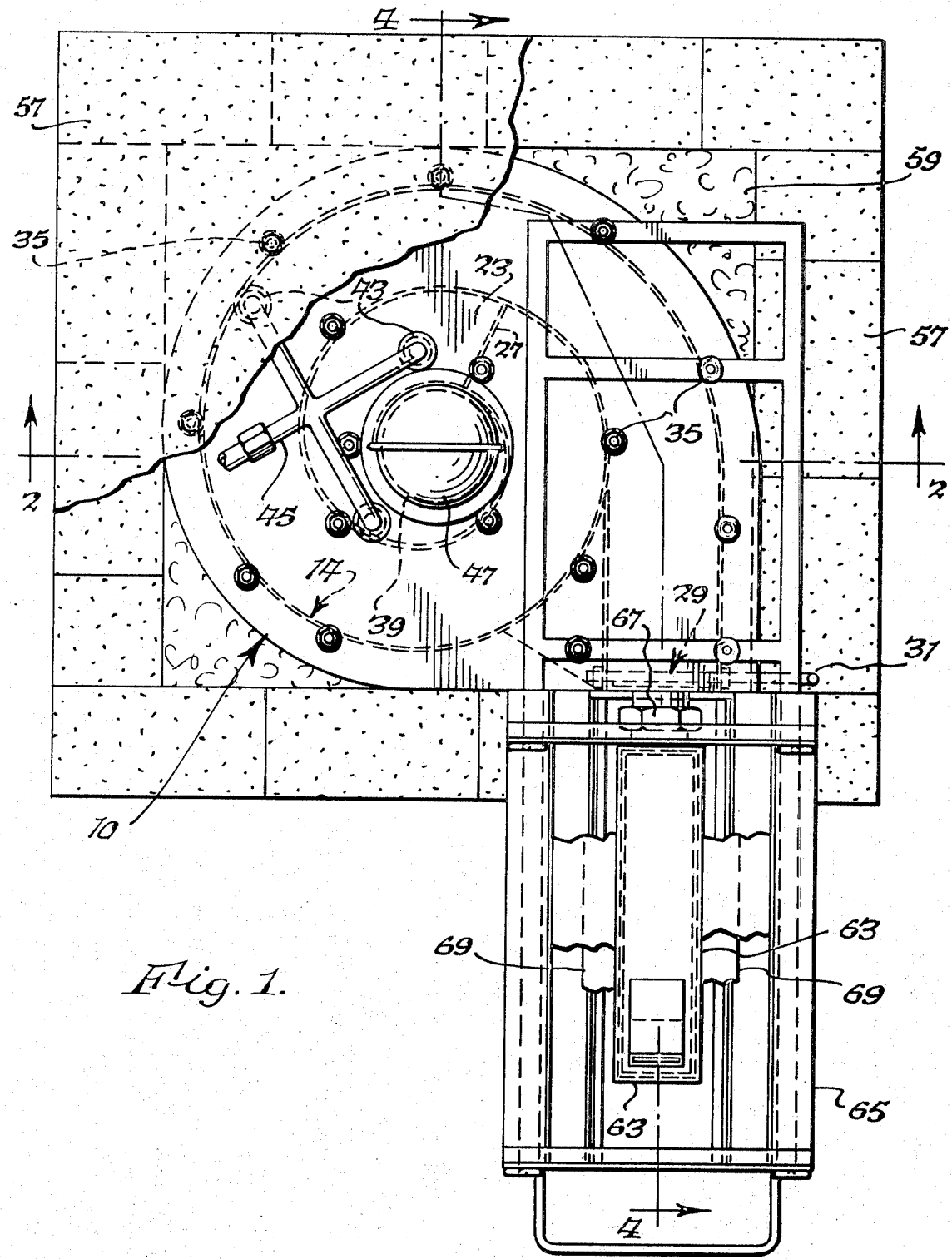
FIG. 1 is a top view of the fiber producing apparatus with a portion shown in section.
Figure 2:
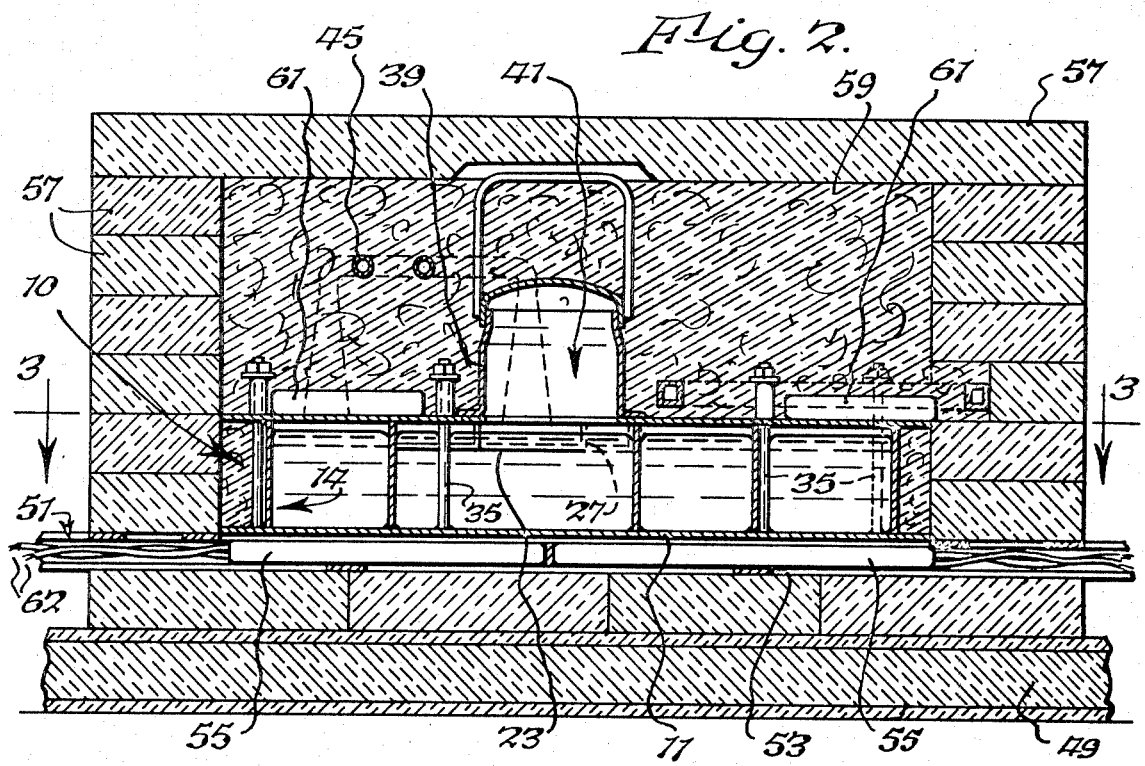
FIG. 2 is a vertical sectional view along line 2—2 of FIG. 1.
Figure 3:
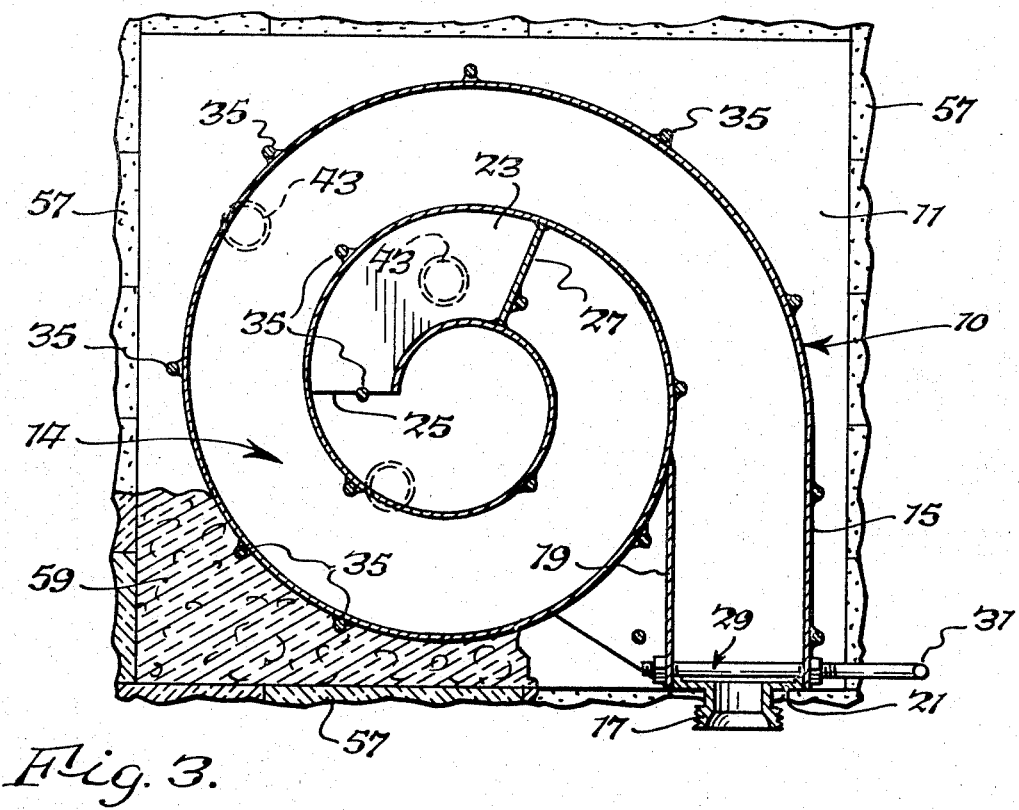
FIG. 3 is a horizontal sectional view of the furnace along line 3—3 of FIG. 2.

The furnace 10 includes a flat floor or bottom 11 and a curved wall 13 secured to the floor 11 and substantially perpendicular thereto. The wall 13 is substantially spirally shaped with one end thereof near the center of the spiral and the other end near the periphery of the spiral. The wall 13 is of substantially uniform height which depends on the depth of the fiberizable fluid desired. The wall 13 forms a channel 14 between the inside surface of one portion of the wall and an outside surface of another portion of the wall 13. The channel 14 is of a substantially constant width throughout its entire length.

The terms outer and inner and the like as hereinafter used are applied only for convenience of description and should not be taken as limiting the scope of this invention. With regard to a spiral, inner is toward the center of the spiral while outer is toward the periphery of the spiral.

An outlet 17 is located in the forehearth area of the furnace 10. A straight portion 15 of the wall 13 and another wall 19 which is substantially parallel to the straight portion 15 and spaced therefrom forms an outlet portion of channel 14. The wall 19 abuts an inner curved portion of wall 13. An end plate 21 in the forehearth section joins the ends of wall 13 and wall 19. A threaded fitting can be used for outlet 17 for attachment to a bushing.

A baffle 23 extends laterally across the upper portion of channel 14 in the path of fluid flow adjacent the inlet end or inner portion of the channel 14. The baffle 23 includes a shelf 25 which is substantially parallel to the furnace bottom 11 and is disposed below the level of fluid. The downstream end of the shelf includes a back 27 projecting upwardly from the shelf 25 so as to block the flow of fluid. The shelf 25 and back 27 abut the wall 13 so as to form a trough which skims and collects froth.

A valve 29 is provided at the outlet 17 of channel 14. The valve 29 includes an arm 31 pivotably mounted across the channel 14. The arm 31 has a depending gate 33 in the form of a plate projecting into the channel 14. The flow of fluid is controlled by turning the arm 31.

The channel 14 is formed by placing vertically extending studs 35 in the shape of a spiral around the furnace floor. The wall 13 is then bent around and between the studs 35 so as to form the channel 14.

The furnace is provided with a top 37 which has a neck 39 forming an inlet opening 41 for adding a fiberizable material. The neck 39 is positioned over the inlet end of channel 14 near the inner end of the spiral wall 13. The neck 39 is provided with a cap 47. The top 37 is substantially parallel to the bottom or floor 11 of the furnace. The top 37 includes a plurality of vents 43 having a manifold 45 connected thereto. The floor 11, wall 13 and top 37 are formed of a material such as stainless steel or other suitable material that is compatible with the fiberizing material being used.

The furnace floor 11 is generally flat so that the fluid flows slowly through the channel 14 due to the effect of gravity as new fiberizable material is added. It is also contemplated that the channel 14 may be inclined along its curve thereof so as to increase the rate of flow of the fluid.

The furnace 10 is supported by a board 49 of asbestos or other insulating material. A rack 51 is positioned between the floor and the board 49 is provided with cross members 53 for holding a plurality of heating elements 55. Each heating element 55 is a ceramic plate-type which fits between the cross members 53. Each element 55 comprises a high temperature wire or coil which heats an outer ceramic plate. The cross members 53 extend vertically so that the heating elements 55 do not support the weight of the furnace 10. As illustrated in the drawings, the heating elements 55 may be withdrawn from the rack 51 during the operation of the furnace 10 so that a replacement may be made. An insulating brick wall 57 is built around the periphery of the furnace 10. A fiber 59 insulating material such as Fiberfrax (The Carborundum Company) is disposed between the furnace 10 and the brick wall 57 thereby providing insulation. A plurality of heating elements 61 are placed on the top 37 prior to covering with insulating material 59.

Each of the heating elements 55 is connected to a source of electricity by suitable connections 62. Various controls known in the prior art may be provided for maintaining the proper temperature. It has been found that a furnace of this design is ideally suited for producing boric oxide fibers at fluid temperatures from about 600° C to about 1,000° C.

The bushing 63 comprises a V-shaped stainless steel trough supported by a frame 65 which is secured to a furnace 10. The bushing 63 is attached to the forehearth for the flow of fluid by a coupling 67 as illustrated in the drawings. Other methods of connection may be provided. Heating plates 69 are disposed against the sides of the bushing to maintain proper temperatures. A fiber insulation is disposed between the heating plates 69 and the frame. The bottom of the bushing 63 is rectangularly shaped and includes apertures for the egress of streams of molten glass 71. The bushing 63 is provided with a cover plate having heating elements in proximity thereto.

As illustrated in FIG. 4 the streams of molten material 71 issuing from the bushing 63 are drawn onto a spool or other means for the production of fiber. Any conventional drawing unit may be used in connection with the bushing 63 for drawing the fibers.

In operation, a solid fiberizing material such as a thermoplastic, glass material, boric oxide or other inorganic or organic fiberizing material is added to the furnace through the neck 39 and the cover. As the material in the furnace becomes liquid and reaches a proper temperature, the valve 29 which controls the flow of fluid into the bushing is open and fibers drawn. As the fibers are drawn, the fluid displaced from the bushing 63 is replaced with a fluid of uniform consistency which has flowed through the channel 14. On its path through the spiral channel 14, the fluid encounters the baffle 23 which removes froth. It is desirable that the fluid be cooked for a certain period of time to remove bubbles and provide for consistency. Depending on the desired time, the spiral channel 14 may be made longer or shorter, or the fluid may be caused to flow faster due to an incline of the channel 14. If it is desired to change a bushing 63 during operation of the furnace, the valve 29 may be closed and a new bushing 63 installed.

While preferred embodiments of this invention have been described it is to be recognized that modifications and variations thereof may be made without departing from the spirit and scope of this invention as set forth in the appended claims.

What is claimed is:

1. A furnace for producing a fiberizable fluid from a fiberizable material comprising a channel describing a spiral course for the flow of fluid, said channel having an inlet at one end for adding fiberizable material and an outlet at the other end thereof for removing a fiberizable fluid and means for heating fiberizable material to a suitable temperature.

2. A furnace according to claim 1 comprising insulating material surrounding said channel and said heating means.

3. A furnace according to claim 1 including a furnace bottom, and a wall attached to said bottom, said channel being formed between an inner and outer surface of said wall.

4. A furnace according to claim 1 wherein said channel includes a top, said top having an inlet opening near the inner portion of said spiral channel for adding a fiberizable material.

5. A furnace according to claim 1 comprising a baffle disposed across an upper portion of said channel.

6. A furnace according to claim 5 wherein said baffle comprises a shelf disposed below the level of fluid in said channel, and a back at the downstream end of said shelf projecting above the level of fluid so as to block the flow of fluid.

7. A furnace according to claim 1 including a valve at the outlet end of said channel.

8. Apparatus for producing fibers from a fiberizable material comprising a channel describing a spiral course for the flow of fluid, said channel having an inlet at the inner portion of the spiral course, a bushing connected at the outer portion of the spiral course for the flow of fiberizable fluid thereto, said bushing having a plurality of apertures for the egress of fluid, and means for heating the fiberizable material to a suitable temperature.

9. Apparatus according to claim 8 comprising a bottom, spiral wall attached to said bottom, said channel being formed between an inner surface and outer surface of said wall.

10. Apparatus according to claim 9 comprising a top attached to the wall, said top having an inlet opening for adding a fiberizable material to the inlet.

11. Apparatus according to claim 10 comprising a baffle disposed across an upper portion of said channel.

12. Apparatus according to claim 11 wherein said baffle comprises a shelf disposed below the level of fluid in said channel and a back at the downstream end of said shelf projection above the level of fluid so as to block the flow of fluid.

13. Apparatus according to claim 8 comprising a valve positioned between said channel and said bushing for controlling the flow of fluid thereto.

* * * * *